(12) United States Patent
Butta

(10) Patent No.: US 12,422,036 B2
(45) Date of Patent: Sep. 23, 2025

(54) BREATHER STRUCTURE IN POWER UNIT

(71) Applicant: MUSASHI SEIMITSU INDUSTRY CO., LTD., Toyohashi (JP)

(72) Inventor: Naofumi Butta, Toyohashi (JP)

(73) Assignee: Musashi Seimitsu Industry Co. Ltd., Aichi (JP)

(*) Notice: Subject to any disclaimer, the term of this patent is extended or adjusted under 35 U.S.C. 154(b) by 0 days.

(21) Appl. No.: 18/839,895

(22) PCT Filed: Feb. 25, 2022

(86) PCT No.: PCT/JP2022/007942
§ 371 (c)(1),
(2) Date: Aug. 20, 2024

(87) PCT Pub. No.: WO2023/162153
PCT Pub. Date: Aug. 31, 2023

(65) Prior Publication Data
US 2025/0164001 A1  May 22, 2025

(51) Int. Cl.
*F16H 57/02* (2012.01)
*F16H 57/027* (2012.01)
(Continued)

(52) U.S. Cl.
CPC ......... *F16H 57/027* (2013.01); *F16H 57/031* (2013.01); *F16H 57/0424* (2013.01);
(Continued)

(58) Field of Classification Search
CPC .... F16H 57/027; F16H 57/031; F16H 57/042; F16H 57/0424; F16H 57/0471; F16H 2057/02034; F16H 57/037
See application file for complete search history.

(56) References Cited

U.S. PATENT DOCUMENTS 10,072,749 B2 *  9/2018  Reth ............... B60K 17/3465
10,920,870 B2 *  2/2021  Iizuka ............. F16H 57/0457
(Continued)

FOREIGN PATENT DOCUMENTS

CN  110061588 A  *  7/2019
JP  2001090813 A  *  4/2001  ......... F16H 57/027
(Continued)

OTHER PUBLICATIONS

PCT/ISA/210 from International Application PCT/JP2022/007942 with the English translation thereof.
(Continued)

*Primary Examiner* — Adam D Rogers
(74) *Attorney, Agent, or Firm* — Carrier, Shende & Associates P.C.; Fulchand P. Shende; Joseph P. Carrier

(57) ABSTRACT

A breather structure in a power unit is provided. The power unit includes a motor and a transmission device. The transmission device includes a gear transmission mechanism and a transmission case. The transmission case and a motor case forms a unit case. The unit case includes an oil supply passage, an oil return passage, and a partition wall. One side face of the partition wall and a lid coupled to the one side face define a breather chamber. The breather chamber includes an inlet that is open to the other side face of the partition wall and that communicates with a motor space.

5 Claims, 11 Drawing Sheets

(51) Int. Cl.
*F16H 57/031* (2012.01)
*F16H 57/04* (2010.01)
*F16H 57/037* (2012.01)

(52) U.S. Cl.
CPC .................. *F16H 57/0471* (2013.01); *F16H 2057/02034* (2013.01); *F16H 57/037* (2013.01)

(56) References Cited

U.S. PATENT DOCUMENTS

| | | | |
|---|---|---|---|
| 11,761,529 B2* | 9/2023 | Nonoyama | F16H 57/027 74/606 R |
| 12,066,093 B2* | 8/2024 | Fujikawa | F16H 57/0476 |
| 2003/0098204 A1 | 5/2003 | Mogi | |

FOREIGN PATENT DOCUMENTS

| | | | | |
|---|---|---|---|---|
| JP | 2003-161363 A | 6/2003 | | |
| JP | 6137317 B2 | 5/2017 | | |
| JP | 2017-161000 A | 9/2017 | | |
| JP | 2020-067101 A | 4/2020 | | |
| WO | WO-2017168617 A1 * | 10/2017 | ............. | B62K 11/00 |
| WO | WO-2023162154 A1 * | 8/2023 | | |
| WO | WO-2023162155 A1 * | 8/2023 | ......... | F16H 57/0424 |
| WO | WO-2024075292 A1 * | 4/2024 | | |

OTHER PUBLICATIONS

The International Preliminary Report on Patentability for PCT/JP2022/007942.

* cited by examiner

BREATHER STRUCTURE IN POWER UNIT

TECHNICAL FIELD

The present invention relates to a breather structure in a power unit, in particular, a power unit including a motor and a transmission device receiving an output of the motor, the transmission device including a gear transmission mechanism capable of transmitting the output of the motor to a drive shaft and a transmission case including therein a transmission mechanism chamber housing the gear transmission mechanism, the transmission case and a motor case forming a unit case of the power unit.

BACKGROUND ART

The above-described power unit has been known as disclosed in, for example, Patent Document 1 below, and a transmission case therein is provided with a breather chamber.

PRIOR ART DOCUMENTS

Patent Documents

Patent Document 1: Japanese Unexamined Patent Application Publication No. 2017-161000

SUMMARY OF THE INVENTION

Problems to be Solved by the Invention

In the power unit of Patent Document 1, in order to inhibit an oil that has been splashed by each gear of the gear transmission mechanism in the transmission case from entering a breather chamber (50), a devise is made on an arrangement portion of an inlet (50a) of the breather chamber. However, the inlet of the breather chamber is open directly to an inside of the transmission case and is located in a position relatively close to a gear (37), which is a portion of the gear transmission mechanism, and thus it is not possible to surely inhibit the oil scattered from the gear (37) from entering the breather chamber.

The present invention has been proposed in view of the above. An object of the present invention is to provide a breather structure in a power unit that can solve the above-described issue in conventional apparatuses.

Means for Solving the Problems

In order to achieve the above-described object, the present invention has a first feature to provide a breather structure in a power unit, the power unit comprising a motor and a transmission device that is configured to receive an output of the motor, the transmission device including a gear transmission mechanism capable of transmitting the output of the motor to a drive shaft and a transmission case including therein a transmission mechanism chamber housing the gear transmission mechanism, the transmission case and a motor case for the motor forming a unit case of the power unit, wherein the unit case includes an oil supply passage configured to supply at least one bearing of a motor output shaft with a portion of an oil lubricating the gear transmission mechanism, an oil return passage configured to return an oil from a motor space inside the motor case to the transmission mechanism chamber, and a partition wall having one side face facing the transmission mechanism chamber and an other side face facing the motor space, wherein the one side face of the partition wall and a lid coupled to the one side face define a breather chamber that is shielded from the transmission mechanism chamber and that is open to an atmospheric air, and wherein the breather chamber includes an inlet that is open to the other side face of the partition wall and that communicates with the motor space.

In addition to the first feature, the present invention has a second feature in which the gear transmission mechanism includes, on an output side of a gear transmission path thereof, a final driven gear configured to transmit a rotational driving force to the drive shaft, and at least a portion of the breather chamber overlaps with the final driven gear as viewed from an axial direction of the final driven gear.

In addition to the first or second feature, the present invention has a third feature in which the gear transmission mechanism includes a counter gear on the gear transmission path, and at least a portion of the breather chamber overlaps with the counter gear as viewed radially outward from a rotational axis of the counter gear.

In addition to any one of the first to third features, the present invention has a fourth feature in which the other side face of the partition wall is provided with a protruding wall protruding toward the motor space and surrounding the inlet of the breather chamber.

In addition to any one of the first to fourth features, the present invention has a fifth feature in which the inlet of the breather chamber faces a stator fixed inside of the motor case.

Effects of the Invention

According to the first feature, in the power unit including the motor and the transmission device, the unit case includes the oil supply passage configured to supply at least one bearing of the motor output shaft with the portion of the oil lubricating the gear transmission mechanism, the oil return passage configured to return an oil from the motor space to the transmission mechanism chamber inside the transmission case, and the partition wall having one side face facing the transmission mechanism chamber, and the other side face facing the motor space, in which the one side face of the partition wall and the lid coupled to the one side face define the breather chamber, and the breather chamber includes the inlet that is open to the other side face of the partition wall and that communicates with the motor space. Accordingly, since the inlet of the breather chamber is not open directly to the transmission mechanism chamber and communicates with the transmission mechanism chamber through the motor space, the oil scattered from each gear of the gear transmission mechanism inside the transmission case can be effectively inhibited from entering the breather chamber. This can reduce a risk of splashing the oil from the breather chamber. Moreover, since the breather chamber is defined by the one side face of the partition wall of the transmission case and the lid coupled to the one side face, it is also possible to easily obtain a hollow structure of the breather chamber separated from the transmission mechanism chamber without complicating a structure of the partition wall of the transmission case and its molding process, thus contributing to cost reduction.

According to the second feature, since the gear transmission mechanism includes, on the output side of the gear transmission path thereof, the final driven gear configured to transmit the rotational driving force to the drive shaft, and at least the portion of the breather chamber overlaps with the final driven gear as viewed from an axial direction of the final driven gear, it is possible to inhibit the breather chamber from largely protruding axially outward to the final driven gear, and it is advantageous in making the transmission case more compact radially.

According to the third feature, since the gear transmission mechanism includes the counter gear on the gear transmission path, and at least the portion of the breather chamber overlaps with the counter gear as viewed radially outward from the rotational axis of the counter gear, it is possible to inhibit the breather chamber from largely protruding to an axially outward side with respect to the counter gear, and it is advantageous in making the transmission case more compact axially.

According to the fourth feature, since the other side face of the partition wall is provided with the protruding wall protruding toward the motor space and surrounding the inlet of the breather chamber, even when the oil is slightly scattered within the motor space, it is possible to effectively inhibit the scattered oil within the motor space from entering the breather chamber, using the protruding wall.

According to the fifth feature, since the inlet of the breather chamber faces the stator fixed inside of the motor case, the inlet of the breather chamber faces the stator that does not rotate within the motor space, thereby more effectively inhibiting, using the stator, the oil from entering the breather chamber through the motor space.

EXPLANATION OF REFERENCE NUMERALS

Figure 1:
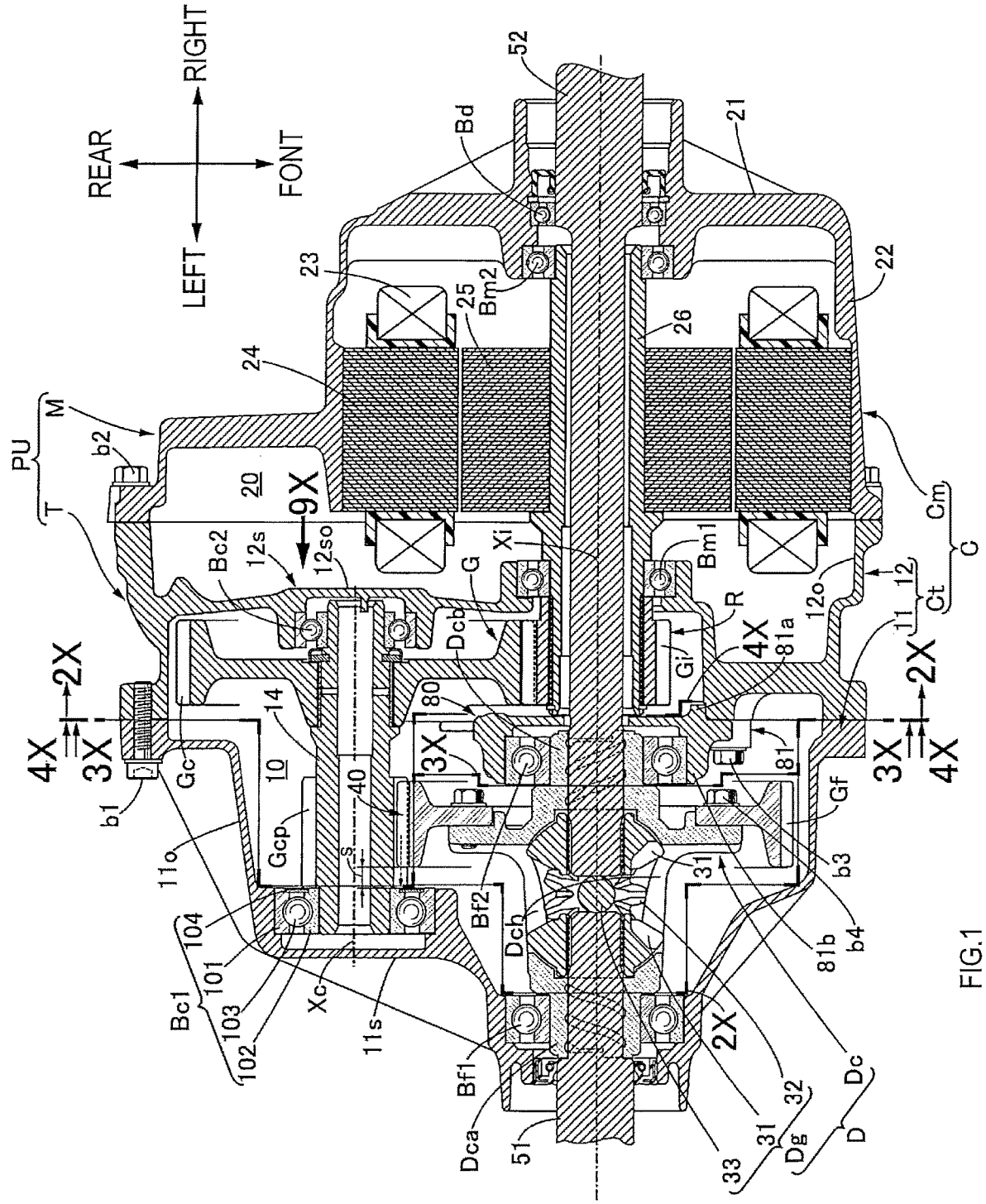
FIG. 1 is an overall sectional view of an embodiment of a power unit according to the present invention, in which a section extending through rotational axes of an input gear and a counter gear is seen from below (sectional view along line 1X-1X in FIG. 2).

Bm1, Bm2 . . . motor bearings
C . . . unit case
Cm . . . motor case
Ct . . . transmission case
G . . . gear transmission mechanism
Gf . . . final driven gear
Gi . . . input gear
Gc . . . counter gear
M . . . motor
PU . . . power unit
T . . . transmission device
Xc . . . rotational axis of the counter gear
10 . . . transmission mechanism chamber
12s . . . partition wall
12si, 12so . . . left face serving as one side of the partition wall right face serving as the other side of the partition wall
12t . . . protruding wall
16 . . . oil return passage
17 . . . first oil supply passage as an oil supply passage
20 . . . motor space
24 . . . stator
26 . . . motor output shaft
51, 52 . . . drive shafts
60 . . . breather chamber
60i . . . inlet of the breather chamber
90 . . . second oil supply passage as an oil supply passage

MODE FOR CARRYING OUT THE INVENTION

First, in FIG. 1 to FIG. 4, a power unit PU mounted in a vehicle, for example, an automobile, comprises an electric motor M as a power source, and a transmission device T that transmits an output of the motor M to left and right drive wheels. A metal unit case C of the power unit PU is fixed to and supported on an appropriate portion of a vehicle body, and comprises a transmission case Ct serving as an outer shell of the transmission device T and a motor case Cm serving as an outer shell of the motor M.

In a space inside the transmission case Ct, that is, in a transmission mechanism chamber 10, a reduction device R decelerating the output of the motor M and a differential device D are arranged. The differential device D distributes an output of the reduction device R to left and right drive shafts 51, 52 (and thus, left and right drive wheels that interlock with the shafts 51, 52 and rotate) while allowing differential rotation.

Front-rear, left-right, up-down directions in the specification and the drawings refer to front-rear, left-right, up-down directions in a state in which the power unit PU is mounted in the vehicle.

The motor case Cm is configured to integrally include an outer end wall 21 and a tubular outer circumferential wall 22 continuous to an outer peripheral portion of the outer end wall 21 and have a bowl-like body that is open towards the transmission case Cm. In a space inside a motor case Ct, that is, in a motor space 20, a circular annular stator 24 that is fixed to an inner circumferential wall of the outer circumferential wall 22 of the motor case Cm and that is wound by a plurality of coil groups 23 at distances therebetween in its circumferential direction; a rotor 25 that includes a magnet (not shown) and that works together with the stator 24 to generate a rotational driving force; and a motor output shaft 26 that fixes the rotor 25 to the outer peripheral portion are arranged. Both end portions of the motor output shaft 26 are supported on the transmission case Ct and the motor case Cm via a pair of motor bearings Bm1, Bm2, respectively. Further, the motor output shaft 26 in the embodiment is formed to be hollow, and a drive shaft 52 on a right side extends through a hollow portion of the motor output shaft 26.

The transmission case Ct is configured to be divided into the first and second case half bodies 11, 12 on left and right sides that are detachably coupled to each other. The first case half body 11 located on the left side includes a side wall 11s that covers left portions of the reduction device R and the differential device D, and a tubular outer circumferential wall 11o continuously provided to an outer peripheral portion of the side wall 11s and that covers outer circumferential sides of the reduction device R and the differential device D.

The second case half body 12 on the right side includes a tubular outer circumferential wall 12o that covers the outer circumferential side of the reduction device R, and a partition wall 12s that is integrally and continuously provided around an inner circumferential portion of an axially intermediate portion of the outer circumferential wall 12o and that covers a right portion of the reduction device R. Further, the partition wall 12s functions as a partition wall partitioning the motor space 20 from the transmission mechanism chamber 10. A left face 12si, which is one side face of the partition wall 12s, faces the transmission mechanism chamber 10, and a right face 12so, which is the other side face, faces the motor space 20.

Mutually-facing end faces of the outer circumferential walls 11o, 12o of the first and second case half bodies 11, 12 are detachably joined to each other with a plurality of bolts b1, and a sealing member (in the embodiment, a liquid gasket) to seal a gap between the mutually-facing end faces is interposed therebetween. Mutually-facing end faces of the outer circumferential wall 12o of the second case half body 12 and the outer circumferential wall 22 of the motor case Cm are detachably joined to each other with a plurality of bolts b2, and a sealing member (in the embodiment, a liquid gasket) to seal a gap between the mutually-facing end faces is interposed therebetween.

A bottom part inside the transmission case Ct functions as an oil storage 15 that stores oil for lubrication. An oil surface L of the oil stored in the oil storage 15 is set to such a level to extent that a lower portion of a below-described final driven gear Gf is immersed and in contact with the stored oil in a stop state of the motor M (thus, the reduction device R and the differential device D) (see FIGS. 2 to 4).

In a lower portion of the partition wall 12s of the second case half body 12, an oil return passage 16 that returns an oil from the motor space 20 to the transmission mechanism chamber 10 is formed to penetrate. The motor space 20 and the transmission mechanism chamber 10 are in communication with each other via the oil return passage 16.

Next, an example of the reduction device R will be described with reference to mainly FIG. 1 to FIG. 4.

A transmission mechanism G formed of a gear train and functioning as the reduction device R comprises, for example, an input gear Gi fixed (in the embodiment, by spline fitting and circlip retaining) to an outer circumference of an inner end portion that bulges inside the transmission mechanism chamber 10, of the motor output shaft 26; a counter shaft 14 that is located on a rear upper side relative to a rotational axis Xi of the input gear Gi and that includes a rotational axis Xc parallel thereto; a counter gear Gc fitting and fixed (in the embodiment, by spline fitting and circlip retaining) to the counter shaft 14 to mesh with the input gear Gi; a counter pinion Gcp fixed (in the embodiment, formed integrally) to an outer circumference of the counter shaft 14 in a position spaced away leftward from the counter gear Gc; and a final driven gear Gf that is arranged on a coaxial line relative to the input gear Gi, that has a larger diameter than a diameter of the counter pinion Gcp, and that meshes with the counter pinion Gcp.

Figure 2:
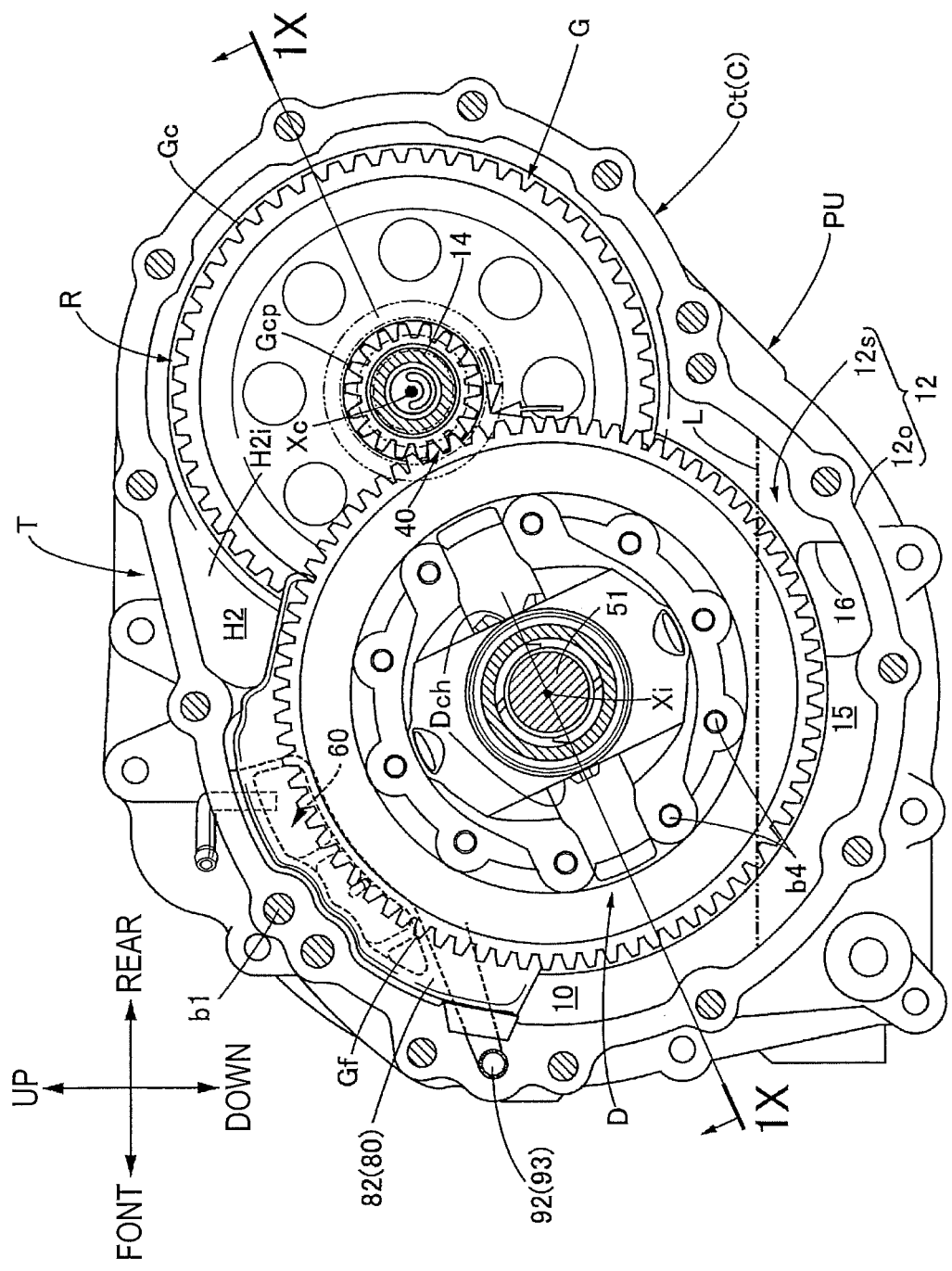
FIG. 2 is a side view of the power unit as seen from a left side, in a state in which a first case half body of a transmission case and bearings attached thereto are omitted (cross-sectional view along line 2X-2X in FIG. 1).
Figure 3:
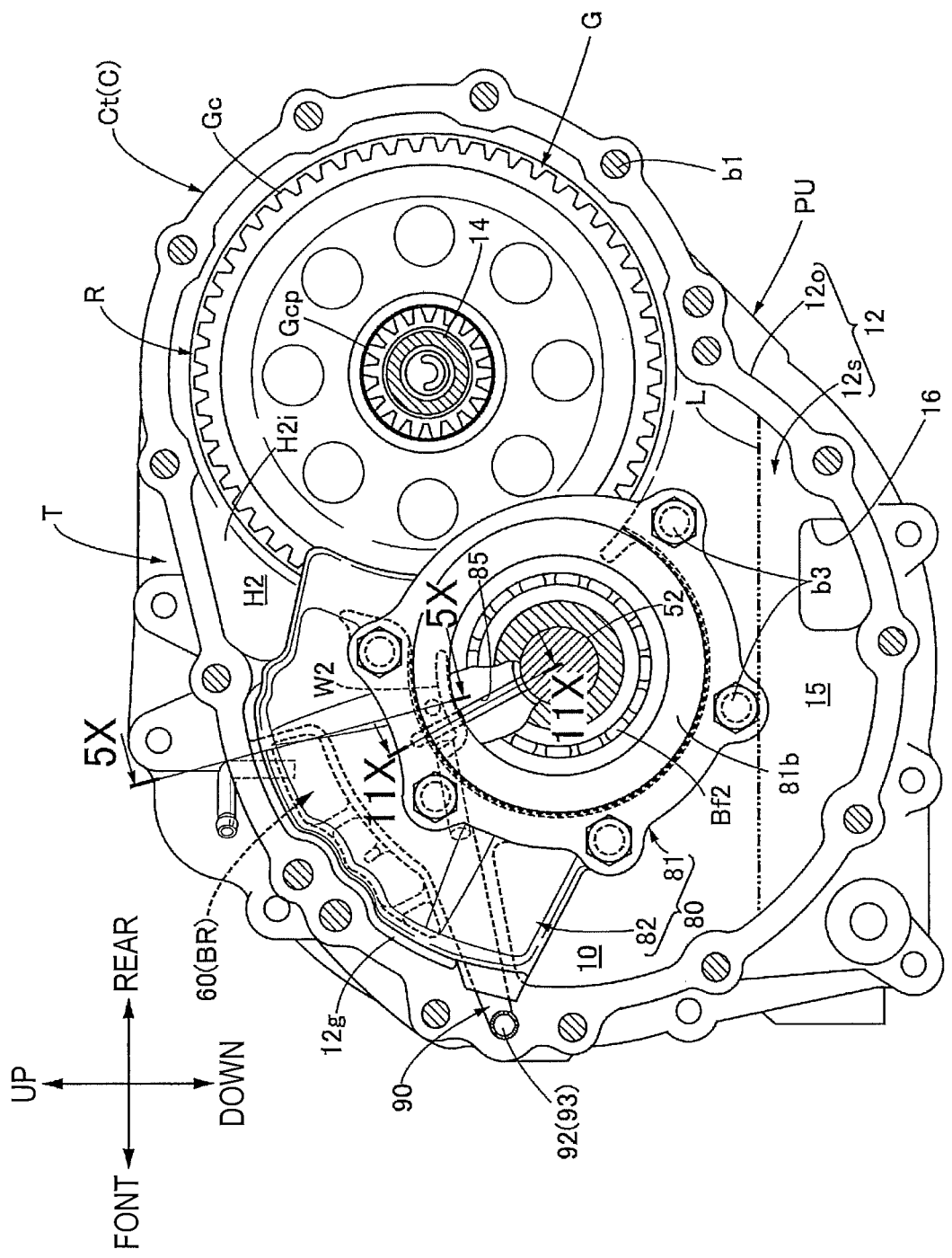
FIG. 3 is a side view of the power unit as seen from the left side, in a state in which a differential case and a final driven gear are omitted in addition to the state shown in FIG. 2 (cross-sectional view along line 3X-3X in FIG. 1).

The final driven gear Gf in the embodiment is arranged so as to mesh with the counter pinion Gcp in a specific semi-circumferential area (right semi-circumferential area relative to the rotational axis Xi in FIG. 2) where a tooth surface moves from a lower end of the final driven gear Gf to an upper end thereof, in accordance with a forward rotation of the final driven gear Gf (rotation in a counterclock direction in FIG. 2).

One end portion of the counter shaft 14 is rotatably supported on the side wall 11s of the first case half body 11 via the first counter bearing Bc1, and the other end portion of the counter shaft 14 is rotatably supported on the partition wall 12s of the second case half body 12 via the second counter bearing Bc2. Specifically, in the embodiment, as is obvious from FIG. 1, the first counter bearing Bc1 is formed of a shielded bearing.

That is, similar to conventionally-known shielded bearings, the first counter bearing Bc1 comprises an outer race 101 and an inner race 102 that each have a circular annular shape, a plurality of balls 103 interposed between mutually-facing circumferences of both races 101, 102, and a synthetic resin or metal shield 104 that has a circular ring plate shape and that is located between one end (right end) of the outer race 101 and one end (right end) of the inner race 102 in an axial direction. The shield 104 is fixed to one of the inner race 101 and the outer race 102 (for example, the outer race 101) and is adjacent to and faces the other of the inner race 101 and the outer race 102 (for example, the inner race 102) at a small clearance.

As the first counter bearing Bc1, a sealed bearing (which is not shown as being conventionally-known) may be employed, in place of the above-described shielded bearing. In this sealed bearing, a contact seal made of rubber or synthetic resin is employed, in place of the above-described noncontact shield 104. This contact seal is fixed to one of the inner and outer races 101, 102 (for example, the outer race 101) and is in slidable contact with the other of the inner and outer races 101, 102 (for example, the inner race 102).

Specifically, in the embodiment, a left side of the shielded bearing or sealed bearing serving as the first counter bearing Bc1 is open, thereby allowing the shielded bearing or sealed bearing to be lubricated with an oil flowing from a right end side of the counter shaft 14 to a left end side through its hollow portion.

The gears Gi, Gc, Gcp, Gf of the gear transmission mechanism G are each formed of helical gears. In FIG. 1, helical teeth of each helical gear are illustrated in a section taken along its tooth trace for convenience. The final driven gear Gf functions as a large diameter gear and is fixed to an outer peripheral portion of a below-described differential case Dc concentrically and by a suitable fixing means (for example, such as bolt-coupling, welding, or the like).

During operation of the reduction device R, due to a relation of the diameter of the counter gear Gc larger than that of the input gear Gi, a primary deceleration is performed between both gears Gc, Gi. Due to a relation of the diameter of the final driven gear Gf larger than that of the counter pinion Gcp, a secondary deceleration is performed between both gears Gf, Gcp. It is noted that the counter gear Gc and the counter pinion Gcp may be integrally formed.

Further, when the motor M rotates in a forward rotation direction to advance an automobile, each of the above-described gears Gi, Gc, Gcp, Gf rotates in the forward rotation direction in conjunction with this rotation. The forward rotation direction is shown in hollow arrows in FIG. 2 and FIG. 4. In this case, the forward rotation direction of the input gear Gi and the final driven gear Gf are same as the forward rotation of the motor M, and a forward rotation direction of the counter gear Gc and the counter pinion Gcp is a direction opposite to the forward rotation direction of the motor M.

The counter pinion Gcp and the final driven gear Gf are arranged such that, during the forward rotations of these gears, the oil on the tooth surface is pushed from a meshing portion 40 to one side (in the embodiment, left side) in an axial direction of the counter pinion Gcp in accordance with a mutual mesh between the counter pinion Gcp and the final driven gear Gf. Obviously, this arrangement relates to a helical angle of the helical gear teeth (that is, orientation of the tooth trace) that has a helical shape with respect to an axis of each of the counter pinion Gcp and the final driven gear Gf.

Further, according to the above-described arrangement of the counter pinion Gcp and the final driven gear Gf, in accordance with movement of the mesh position from a right end to a left end in an axial direction of the teeth when the gears mesh with each other, the oil on the tooth surface is pushed from the meshing portion 40 to an axially left side in a biased manner, as shown in a dotted arrow in FIG. 1.

In contrast to this, in the embodiment, the first counter bearing Bc1 comprising a shielded bearing in the embodiment is employed as a fluid restriction wall that opposes the oil pushed toward the axially left side from the above-described meshing portion 40 to restrict the pushed oil from flowing to the axially left side. In this case, as is obvious from FIG. 1, the first counter bearing Bc1 is arranged adjacent to axially left end faces of the teeth of the counter pinion Gcp, and is formed in a shape such that tooth tip portions of the left end faces of the teeth can be covered (that is, a larger diameter than that of the counter pinion Gcp).

Furthermore, in the counter pinion Gcp in the embodiment, its axially width is set such that a tooth portion of the counter pinion Gcp has a specific length s (see FIG. 1) extending to the axially left side relative to the meshing portion 40 with the final driven gear Gf. In place of this setting, another embodiment may be also enabled in which the length s, of the tooth portion of the counter pinion Gcp, extending to the axially left side from the above-described meshing portion 40 is set to zero or a negligible length.

Next, the differential device D will be described mainly with reference to FIGS. 1 and 2. The differential device D comprises the differential case Dc integrally including bearing boss parts Dca, Deb at both axially end portions of a body part of the differential case Dc; and a differential gear mechanism Dg that is housed in the body part of the differential case Dc and that transmits a rotational force of the differential case Dc to the pair of drive shafts 51, 52 while allowing differential rotation.

The bearing boss part Dca on a left side of the differential case Dc is supported on the side wall 11s of the first case half body 11 via a first differential bearing Bf1, and the bearing boss part Deb on a right side of the differential case Dc is supported on a below-described intermediate case 80, which is fixed to the partition wall 12s of the second case half body 12, via a second differential bearing Bf2. The first and second differential bearings Bf1, Bf2 are an example of a pair of bearings for a final driven gear.

Further, the differential case Dc is rotatably supported on the transmission case Ct on the rotational axis Xi of the input gear Gi. Along with this, the drive shafts 51, 52 rotatably fitted to inner circumferences of the left and right bearing boss parts Dca, Dcb of the differential case Dc are also supported on the transmission case Ct via the differential case Dc and the first and second differential bearings Bf1, Bf2. Furthermore, an intermediate portion of the right drive shaft 52 is supported on the motor case Cm via a bearing Bd.

In one of a fitting surface of the bearing boss part Dca on the left side and the drive shaft 51 and a fitting surface of the bearing boss part Deb on the right side and the drive shaft 52, a helical groove capable of performing a screw pump performance is formed to guide oil scattered inside the transmission case Ct into the differential case Dc.

To an outer circumference of the body part of the differential case Dc, the final driven gear Gf comprising a ring gear is fixed (in the embodiment, with the bolt b4) in a position offset to an axially right side from a center portion of the body part. Further, the differential case Dc includes, in the body part, two or more window portions Dch (in the embodiment, two) are provided in a position offset to the axially left side relative to the final driven gear Gf. The window portions Dch are arranged symmetrically with a pinion shaft 33 interposed therebetween, and functions as an operation hole for gear mounting or as an oil inflow hole between an outside and an inside of the differential case Dc.

From the relation in which the window portions Dch is arranged in a manner offset to the axially left side relative to the final driven gear Gf, the axial position of the window portions Dch is located to partially coincide with the tooth portion of the counter pinion Gcp extending to the axially left side from the meshing portion 40 with the final driven gear Gf, as is obvious from FIG. 1.

Although an example of the differential case Dc is integrally configured in the embodiment, the differential case Dc may be configured to be divided into two or more case elements that are mutually coupled.

Next, the differential gear mechanism Dg will be described. The differential gear mechanism Dg comprises a pair of side-gears 31 that is housed in the differential case Dc and that is rotatable about the same axis as that of the differential case Dc; two or more pinion gears 32 meshing with both side-gears 31; and the pinion shaft 33 that is fixed to the differential case Dc and that rotatably supports the pinion gears 32 about its axis perpendicular to the rotational axis of the side-gears 31. An inner circumference of a center hole of each of the left and right side-gears 31 is interlocked with and coupled to an outer circumference of an inner end portion of each of the first and second drive shafts 51, 52 (in the embodiment, by spline fitting).

The structure and function of the differential device D are conventionally-known, and thus a further description is omitted. However, the rotational driving force is input from the motor M through the reduction device R and then from the final driven gear Gf to the differential case Dc, and the the differential device D distributes and transmits the rotational driving force to the first and second drive shafts 51, 52 while allowing differential rotation.

The unit case C (specifically, transmission case Ct) comprises a first oil capturing part H1 capable of capturing an oil scattered from the input gear Gi; an input gear cover 70 that includes a rear upward open part allowing the counter gear Gc and the input gear Gi to mesh with each other and that covers the input gear Gi; and a breather BR that allows an inside of the unit case C to communicate with an external air while avoiding the oil from splashing out toward the external air. Next, specific structures of the first oil capturing part H1, the input gear cover 70, and the breather BR will be described with reference to FIG. 5 to FIG. 11.

Figure 4:
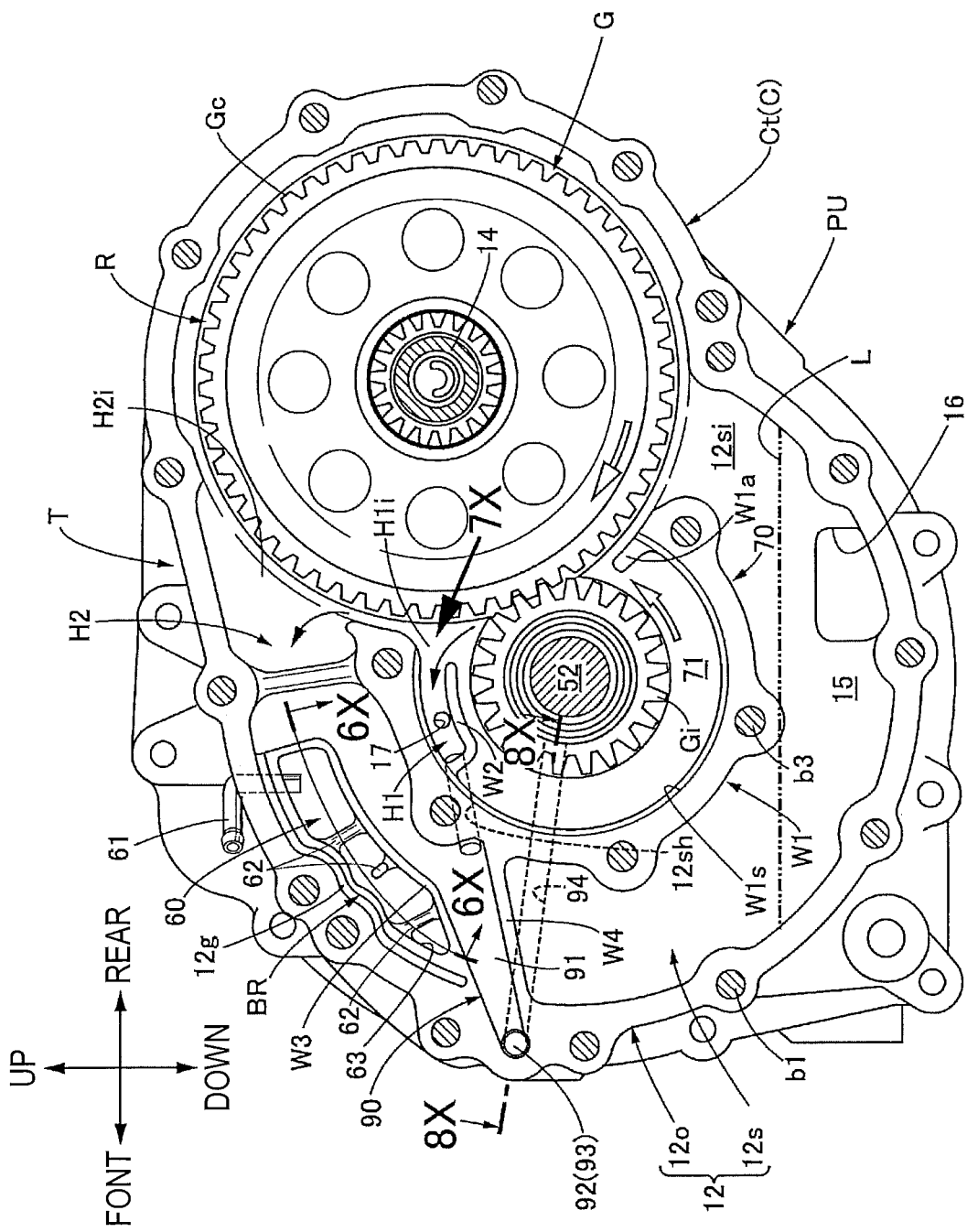
FIG. 4 is a side view of the power unit as seen from the left side, in which an intermediate case is omitted in addition to the state shown in FIG. 3 (cross-sectional view along line 4X-4X in FIG. 1).
Figure 5:
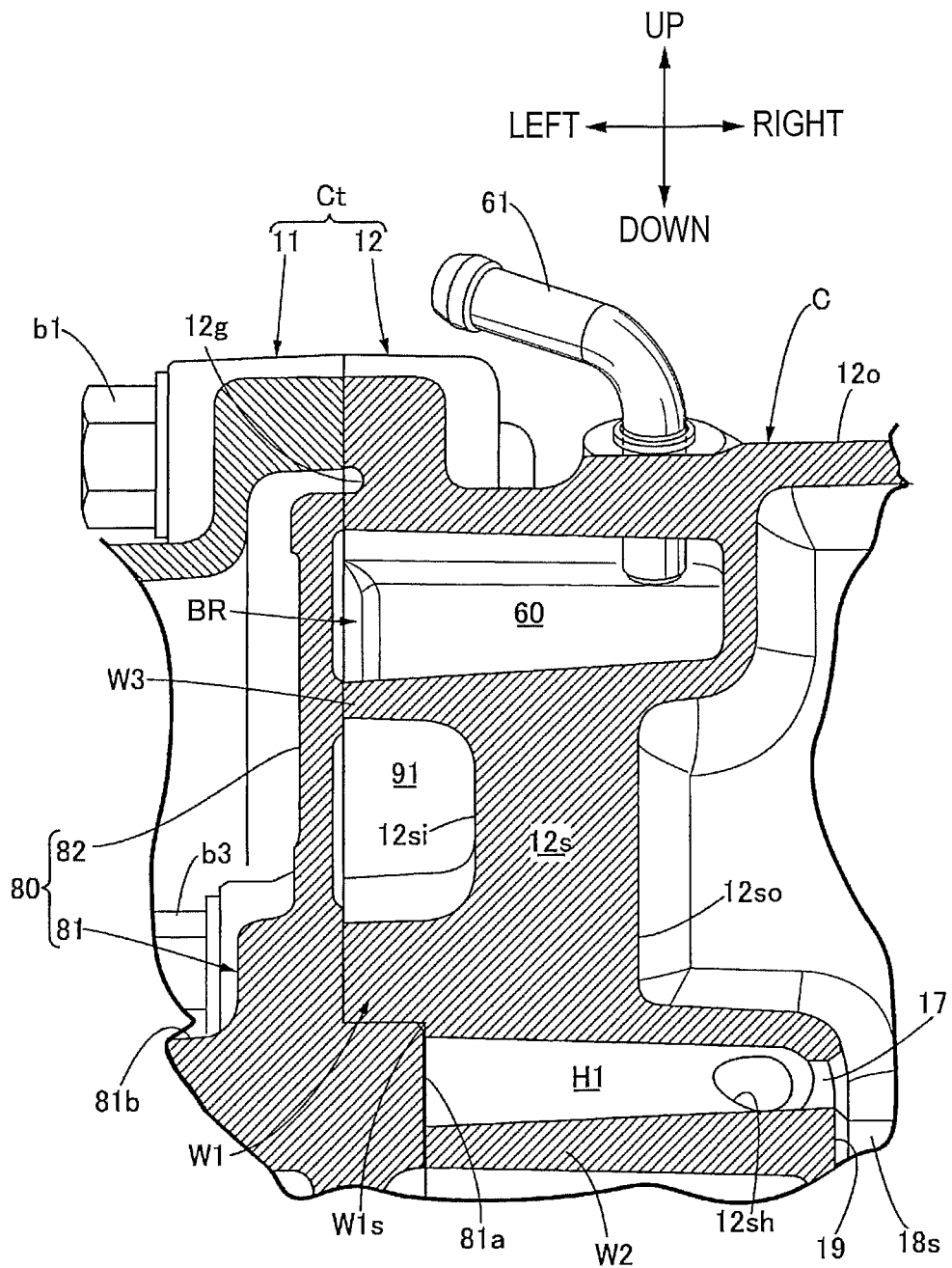
FIG. 5 is a sectional view showing a main portion of a breather and a first oil capturing part (enlarged sectional view along line 5X-5X in FIG. 3).

As is obvious from FIG. 4, in the first oil capturing part H1, an oil inlet port H1$i$ is located on a front side in the forward rotation direction of rotation of the input gear Gi on a common tangent line of pitch circles of the input gear Gi and the counter gear Gc in a side view (that is, as viewed from an axial direction of the input gear Gi). Accordingly, after the input gear Gi, which rotates at high-speeds in conjunction with the motor M, meshes with the counter gear Gc, the oil remaining on the tooth surface is vigorously splashed upward in a direction of the above-described common tangent line due to a centrifugal force and moves into the oil inlet port H1$i$, so that the oil is efficiently captured by the first oil capturing part H1. The oil captured by the first oil capturing part H1 can be supplied to a lubrication target part located in each of the transmission case Ct and the motor case Cm, as described below.

On the other hand, the input gear cover 70 includes the rear upward open part allowing the mutual mesh between the counter gear Gc and the input gear Gi, and has an inner space, of which a lower portion functions as an auxiliary oil storage 71 capable of storing an oil for the input gear Gi. In an upper portion of the internal space of the input gear cover 70, the first oil capturing part H1 is located, and the opening, that is, the oil inlet port H1$i$ faces a meshing portion where the counter gear Gc and the input gear Gi mesh with each other.

The above-described first oil capturing part H1, the input gear cover 70, and the breather BR are formed by the second case half body 12 and the intermediate case 80 that serves as a lid detachably coupled to the partition wall 12$s$.

In more specific description, as is obvious from FIG. 4, the left face 12$si$ of the partition wall 12$s$ is integrally provided with a superior-arc-like input gear surrounding wall W1 surrounding the input gear Gi for its semi-circumference or more; an oil capturing part forming wall W2 extending shortly downward from an upper inner circumference of the input gear surrounding wall W1 and further extending in a circumferential direction of the input gear Gi while changing its direction to a side where the counter gear Gc is located; a breather chamber forming wall W3 that is spaced away upward from the input gear surrounding wall W1 and that extends substantially along an inner circumference of the outer circumferential wall 12$o$ of the second case half body 12; and a communication passage forming wall W4, immediately below the breather chamber forming wall W3, integrally connecting a front portion of the input gear surrounding wall W1 with an front part of the outer circumferential wall 12$o$ of the second case half body 12. Each leading end face (left end face) of the input gear surrounding wall W1, the breather chamber forming wall W3, and the communication passage forming wall W4 is located on the same plane as the corresponding mating surface of the outer circumferential wall 110 of the first case half body 11 and the outer circumferential wall 12$o$ of the second case half body 12.

Specifically, the input gear surrounding wall W1 is provided continuously with a protruding part W1$a$ extending upward from its lower open end, thereby inhibiting the oil from flowing out from the auxiliary oil storage 71. Further, the input gear surrounding wall W1 includes, at an inner circumferential edge of the leading end face (left end face), a positioning step portion W1$s$ that circumferentially extends and that is recessed by a step lower than the leading end face.

On the other hand, the intermediate case 80 comprises a disk-like case body 81 corresponding to the input gear surrounding wall W1, and an upward-protruding portion 82 that is provided continuously and integrally to an upper half portion of the case body 81 and that expands upward in a substantially fan-shape. On an outer surface (left face) of the case body 81, a stepped cylindrical annular boss part 81$b$ is integrally provided in a protruding manner and fittably fixes an outer race of the second differential bearing Bf2 on the right side. The case body 81 includes, on its inner surface (right face), a superior-arc-like protrusion 81$a$ provided in a portion closer to an outer peripheral portion of the case body 81. The superior-arc-like protrusion 81$a$ is integrally provided in a protruding manner so as to extend along the input gear surrounding wall W1 and be fittable to the positioning step portion W1$s$.

The left end face of the outer circumferential wall 12$o$ of the second case half body 12 is formed such that its portion corresponding to the breather chamber forming wall W3 has a wider width. As is obvious from FIG. 2 to FIG. 4, an end face of the wider width has a shallow groove 12$g$ that extends along an upper edge of the upward-protruding portion 82 and that is adjacent to the upward-protruding portion 82. In the groove 12$g$, a portion of a sealing member (for example, liquid gasket) to be applied between the join end faces of the first and second case half bodies 11, 12 can be held.

The intermediate case 80 is fixed to the partition wall 12$s$ of the second case half body 12, and by allowing the above-described superior-arc-like protrusion 81$a$ to be fitted to the positioning step portion W1$s$ of the input gear surrounding wall W1 (see FIG. 1, FIG. 5) and by coupling, with a bolt b3, an inner surface of the outer peripheral portion of the case body 81 to the input gear surrounding wall W1 on an outer side of the superior-arc-like protrusion 81$a$ (see FIGS. 1, 3, 5, and 6). In such a fixed state of the intermediate case 80, the input gear cover 70 is defined by the intermediate case 80 and the partition wall 12$s$ (specifically, by an inner circumference of the input gear surrounding wall W1, the left face 12$si$ of the partition wall 12$s$, and an inner surface of the case body 81).

Moreover, in the above-described fixed state of the intermediate case 80, a top surface (right end face) of the superior-arc-like protrusion 81$a$ of the inner surface of the case body 81 adjacently faces the leading end face (left end face) of the oil capturing part forming wall W2. Accordingly, the first oil capturing part H1 is defined by the case body 81 and the partition wall 12$s$ (specifically, the oil capturing part forming wall W2 and the left face 12$si$ of the partition wall 12$s$).

In the embodiment, the leading end faces (left end faces) of the protruding part W1$a$ and the oil capturing part forming wall W2 are each adjacent to and face each other relative to the inner surface of the case body 81 with a slight gap (for example, 0.5 millimeters), but may abut the inner surface of the case body 81.

As is obvious from FIG. 4, the second case half body 12 of the transmission case Ct includes a second oil capturing part H2 that is located on a front side in the forward rotation direction of the counter gear Gc relative to the first oil capturing part H1 and that is capable of capturing the oil scattered from the counter gear Gc. The second oil capturing part H2 is formed of a concave surface provided on the left face 12*si* of the partition wall 12*s*, in an area between the breather BR and a front portion of the counter gear Gc in front and rear directions and between a front portion of the outer circumferential wall 12*o* of the second case half body 12 and the front portion of the input gear surrounding wall W1 in up and down directions. The second oil capturing part H2 has its rear end opening serving as an oil inlet port H2*i* that is adjacent to and that faces the front portion of the counter gear Gc. Also, the second oil capturing part H2 has its front end portion that directly communicates with a rear end of a below-described first communicating oil passage 91.

In a portion of the partition wall 12*s* forming a side wall portion of the first oil capturing part H1, a first oil supply passage 17 is formed in a through-hole shape so as to guide a portion of the oil captured by the first oil capturing part H1 to a surrounding portion of a first motor bearing Bm1 on the left side. As is obvious from FIGS. 9 and 10, an open end of the first oil supply passage 17 that is open to the motor space 20 (that is, a side where the right face 12*so* of the partition wall 12*s* is located) is located in a position corresponding to a cutout-like slit 18*s* provided in a stepped cylindrical annular boss part 18 that is provided on the right face 12*so* in a protruding manner and that fittably fixes an outer race of the first motor bearing Bm1. The right face 12*so* includes a shallow oil groove 19 provided in a recessed manner, which is recessed and extends radially inward through the slit 18*s* from the open end of the first oil supply passage 17.

As described above, the portion of the oil captured by the first oil capturing part H1 passes through the first oil supply passage 17, and is guided to the first motor bearing Bm1 via the slit 18*s* and the oil groove 19.

On the other hand, the intermediate case 80 includes a third oil supply passage 85 that guides the portion of the oil captured by the first oil capturing part H1 to a surrounding part of the second differential bearing Bf2. As is obvious from FIG. 3 and FIG. 11, the third oil supply passage 85 is formed of a slit-like through-hole that extends radially across the above-described superior-arc-like protrusion 81*a* on the inner surface (right face) of the case body 81 and that axially penetrates through the case body 81. As described above, the portion of the oil captured by the first oil capturing part H1 flows via the third oil supply passage 85, and flows along outer circumferential portions of the second differential bearing Bf2 and the second drive shaft 52.

Figure 7:
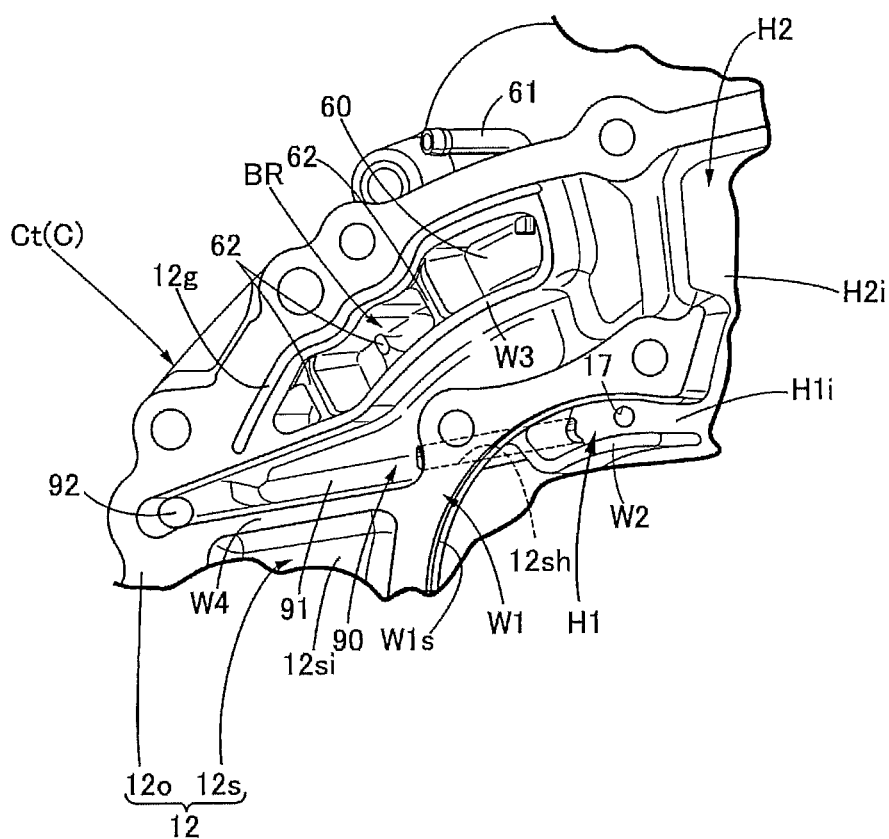
FIG. 7 is an enlarged perspective view of the breather and the first oil capturing part in a state in which the first case half body and the intermediate case are removed from a second case half body (perspective view as seen from an arrow 7X in FIG. 4).

As is obvious from FIGS. 4 and 7, the first communicating oil passage 91 is defined between the second case half body 12 and the intermediate case 80 and extends in the front and rear directions while passing between the breather chamber forming wall W3, and a front portion of the input gear surrounding wall W1 and the communication passage forming wall W4. On the first communicating oil passage 91, a through-oil passage 12*sh* penetrating through the partition wall 12*s* in the front and rear directions has an open front end and a rear end that is open to an innermost portion located in a front of the first oil capturing part H1.

Accordingly, of the oil captured by the first oil capturing part H1, the oil excluding the oil flowing toward the first and third oil supply passages 17, 85 flows, through the through-oil passage 12*sh*, into a portion in the first communicating oil passage 91. The first communicating oil passage 91 communicates with a second communicating oil passage 92 axially provided on the outer circumferential wall 12*o* of the second case half body 12. As is obvious from FIG. 8, the second communicating oil passage 92 communicates with the second motor bearing Bm2 on the right side via a series of first and second communication oil passages 93, 94 extending in the outer and inner circumferential walls 21, 22 of the motor case Cm.

Further, the through-oil passage 12*sh*, the first communicating oil passage 91 (especially, a front half portion), the second communicating oil passage 92, and the first and second communication oil passages 93, 94, which are connected to each other in series, work together to form a second oil supply passage 90 that guides the portion of the oil captured by the first oil capturing part H1 to the second motor bearing Bm2 on the right side. A portion in the second oil supply passage 90 and the above-described second oil capturing part H2 communicate with each other via a rear portion of the first communicating oil passage 91. Accordingly, the oil captured by the second oil capturing part H2 is also guided to the second motor bearing Bm2 via the second oil supply passage 90.

In the above-described fixed state of the intermediate case 80, a breather chamber 60 of the breather BR is defined by the intermediate case 80 and the second case half body 12 (specifically, by an upper surface of the breather chamber forming wall W3, a lower surface of a wider front portion of the outer circumferential wall 12*o* of the second case half body 12, the left face 12*si* of the partition wall 12*s*, and an inner surface of the upward-protruding portion 82).

The breather chamber 60 is shielded from the transmission mechanism chamber 10 by the intermediate case 80 and communicates with an external air through an exhaust cylinder 61 fixed to the front portion of the outer circumferential wall 12*o* of the second case half body 12. Similarly to conventionally-known breathers, the breather chamber 60 includes, on its inner wall (specifically, the left face 12*si* of the partition wall 12*s*), two or more baffles 62, which are provided in a protruding manner to form a labyrinth inside the breather chamber 60 and inhibit the oil from splashing out (see FIGS. 4, 6, and 7).

Figure 6:
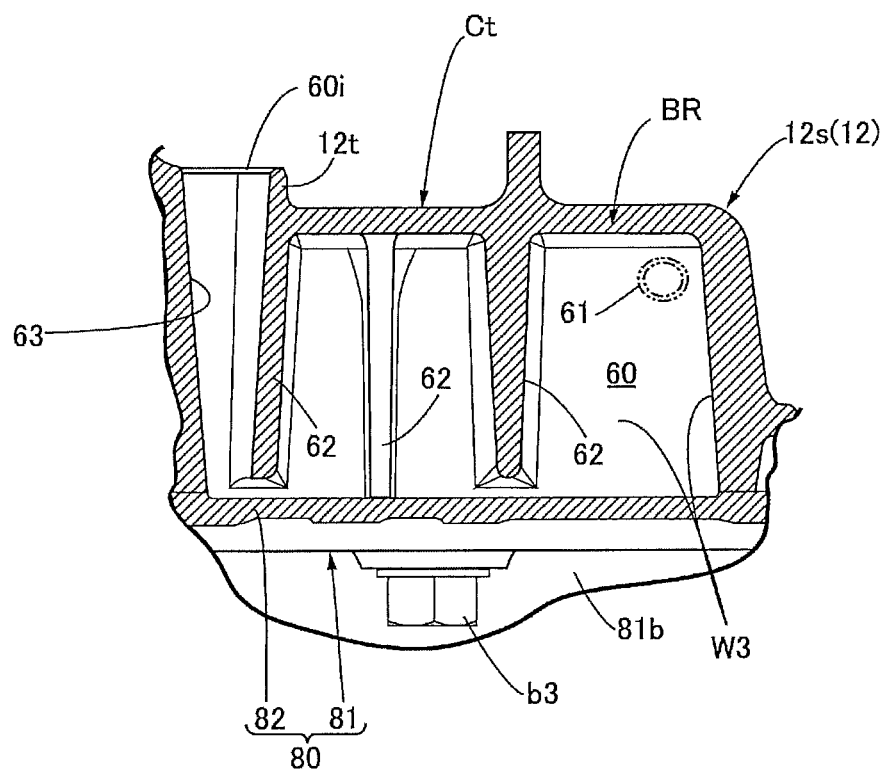
FIG. 6 is a sectional view of an inside of the breather in a section along its longitudinal direction as seen from above (enlarged sectional view along line 6X-6X in FIG. 4).

As is obvious from FIG. 6, a communication passage 63 that allows communication between the breather chamber 60 and the motor space 20 is formed so as to axially penetrate through the partition wall 12*s*. An opening of the communication passage 63 is open to the right face 12*so* of the partition wall 12*s*, and forms an inlet 60*i* of the breather chamber 60 facing the motor space 20.

The breather chamber 60 is in a communication state to communicate with the motor space 20 (and thus, the transmission mechanism chamber 10) through the inlet 60*i*. Accordingly, if a pressure of an air in the motor space 20 is higher than an atmospheric pressure, the air flows in the breather chamber 60 from the inlet 60*i* thought the communication passage 63 and is discharged to an external air through the exhaust cylinder 61.

Figure 9:
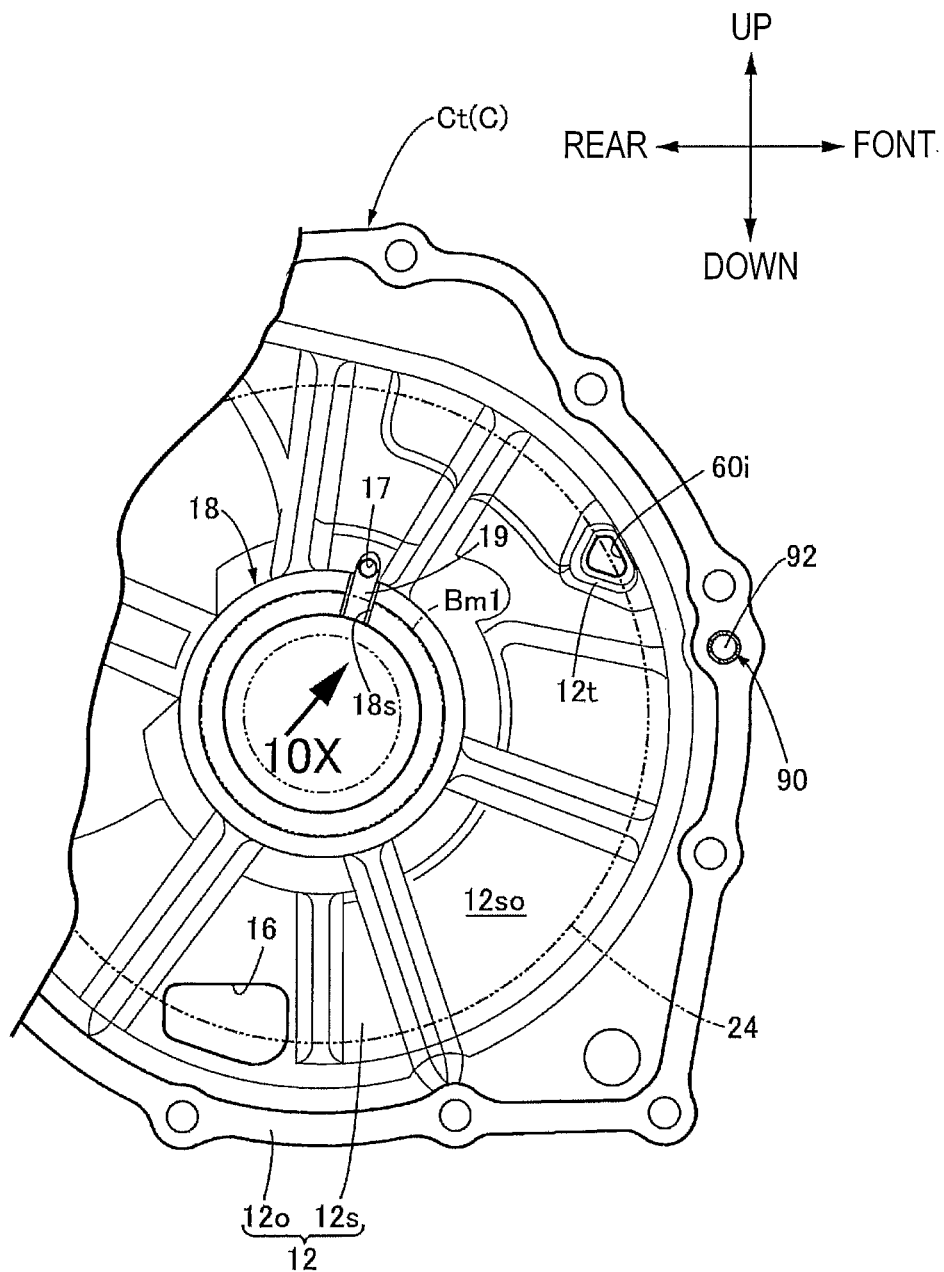
FIG. 9 is a right side view of a main portion of the second case half body in a state in which the motor case is omitted, as seen from a side where the motor is located (diagram from an arrow 9X in FIG. 1).
Figure 10:
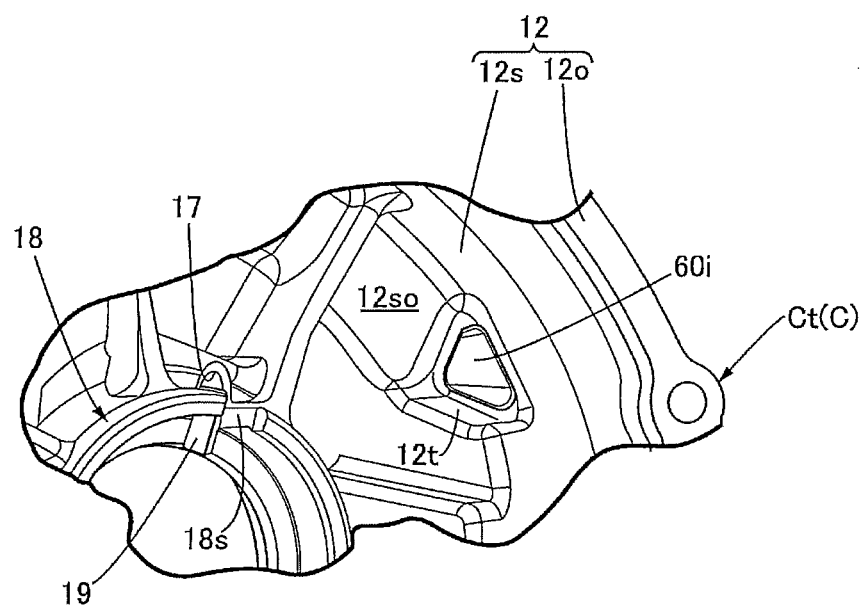
FIG. 10 is a perspective view showing a breather entry on a side face of the second case half body on the side where the motor is located and the vicinity of an opening of a first oil supply passage (enlarged perspective view as seen from an arrow 10X in FIG. 9).
Figure 11:
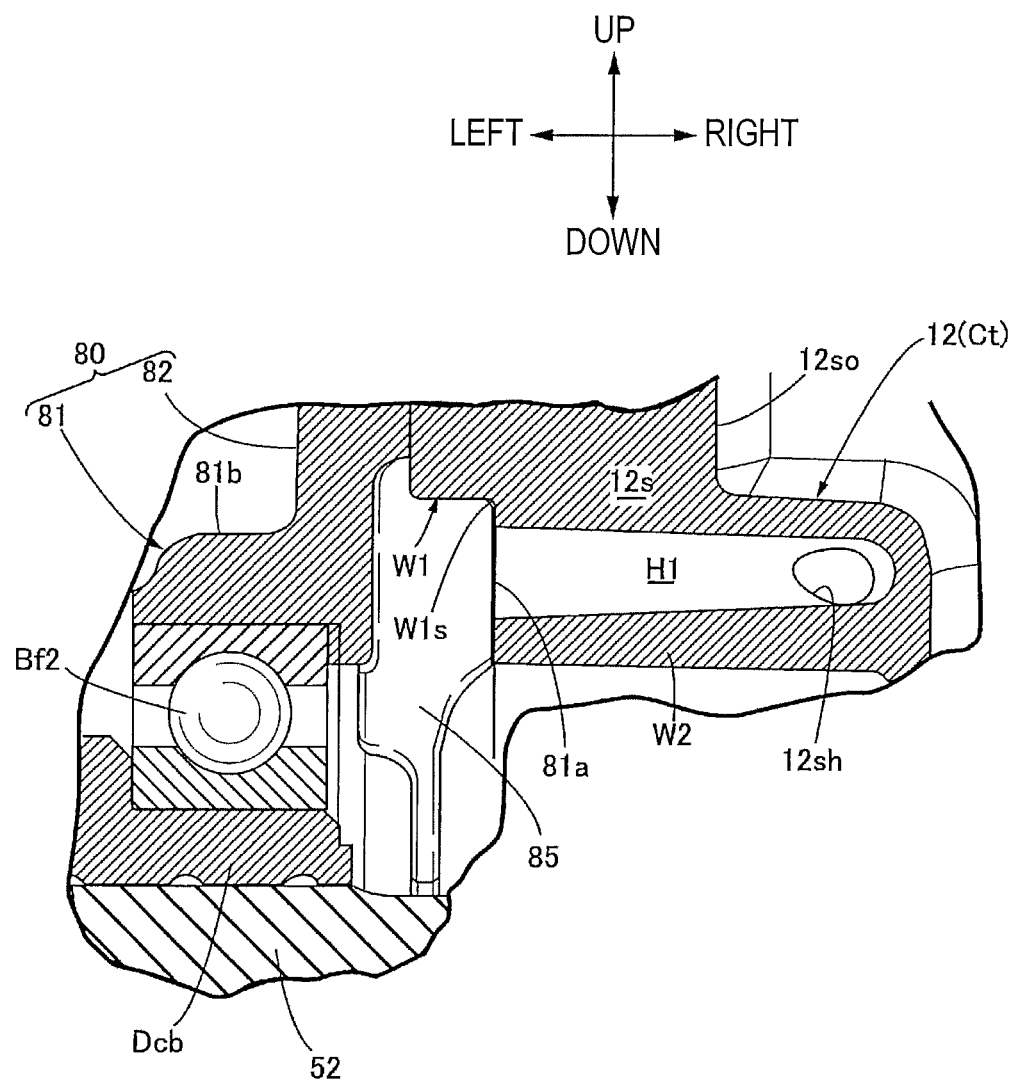
FIG. 11 is an enlarged sectional view along line 11X-11X in FIG. 3.

As is obvious from FIGS. 6, 9, and 10, the right face 12*so* of the partition wall 12*s* in the embodiment is provided with a protruding wall 12*t* protruding toward the motor space 20 and surrounding the inlet 60*i* of the breather chamber 60. Even when the oil is slightly scattered within the motor space 20, a provision of the protruding wall 12*t* makes it possible to effectively inhibit the scattered oil from entering the breather chamber 60.

As is obvious from FIG. 2, at least a portion of the breather chamber 60 is arranged so as to overlap with the final driven gear Gf as viewed from an axial direction of the final driven gear Gf. Since such an arrangement can inhibit the breather chamber 60 from largely protruding axially outward to the final driven gear Gf, it is advantageous in making the transmission case Ct (and thus, the unit case C) more compact radially.

FIG. 1 clearly shows an arrangement in which the counter gear Gc is arranged axially between the intermediate case 80 and the partition wall 12s. From this arrangement, it is clear that the breather chamber 60 defined between the intermediate case 80 and the partition wall 12s is located in a position to partially overlap with the counter gear Gc as viewed radially outward from the rotational axis Xc of the counter gear Gc. Further, since this arrangement can inhibit the breather chamber 60 from largely protruding to an axially outward side with respect to the counter gear Gc, it is advantageous in making the transmission case Ct (and thus, the unit case C) more compact axially.

Figure 8:
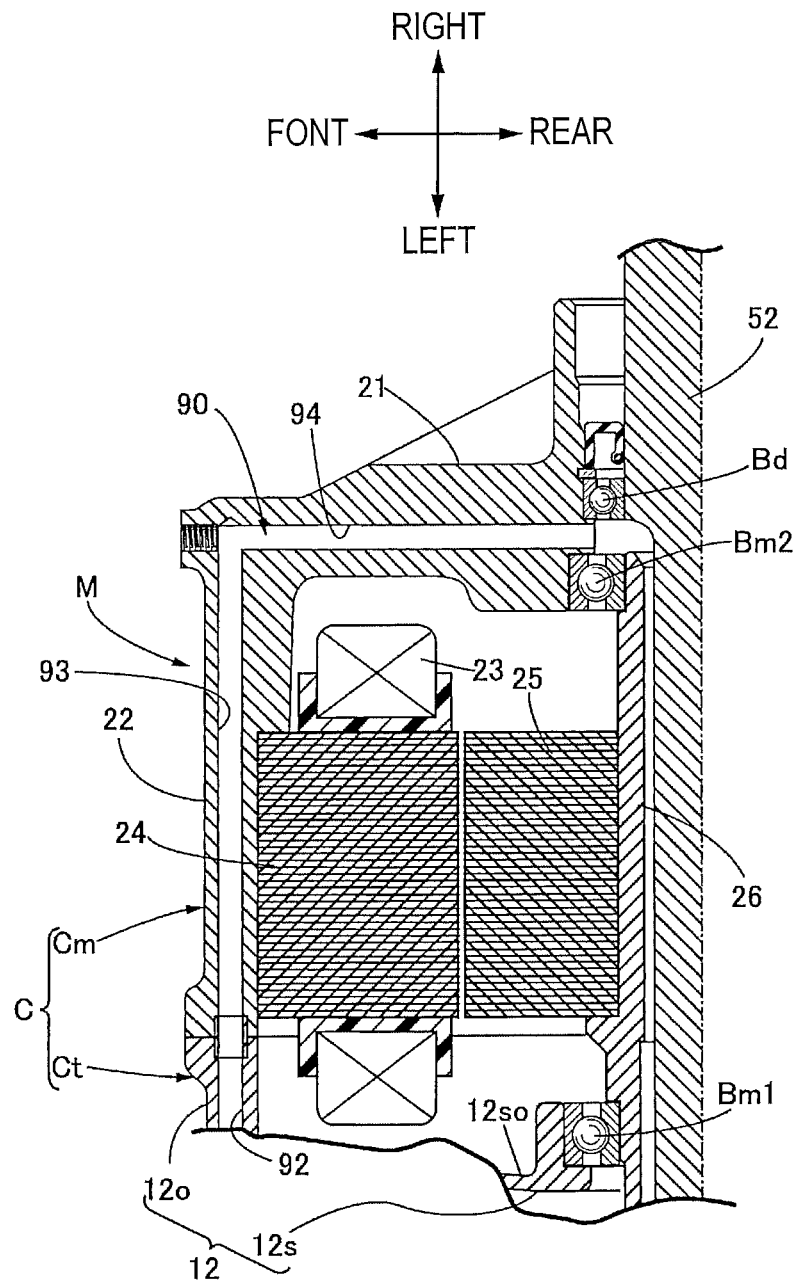
FIG. 8 is a sectional view showing an arrangement of a second oil supply passage in a motor case (sectional view along line 8X-8X in FIG. 4).

As is obvious from FIGS. 8 and 9, the inlet 60i of the breather chamber 60 faces, at a relatively close distance, the stator 24 fixed to the motor case Cm therein. As described above, by locating the inlet 60i of the breather chamber 60 adjacent to and facing the stator 24 that does not rotate within the motor space 20, it is possible to more effectively inhibit, using the stator 24, the oil from entering the breather chamber 60 through the motor space 20.

Next, an operation in the embodiment will be described. In the power unit PU including the transmission device T according to the present invention, upon input of the rotational driving force from the motor output shaft 26 to the input gear Gi in accordance with the operation of the motor M, the rotational driving force is decelerated in two-stages by the reduction device R inside the transmission device T and transmitted to the final driven gear Gf. The differential device D distributes the rotational driving force of the final driven gear Gf to the first and second drive shafts 51, 52 while allowing differential rotation, and the rotational driving force is further transmitted to the left and right drive wheels from the first and second drive shafts 51, 52.

In the stop state of the motor M, a specific amount of oil is stored in the oil storage 15 located at the bottom part inside the transmission case Ct, and a portion of the oil that has been scattered and flowed downward inside the transmission mechanism chamber 10 in accordance with the previous operation of the motor M is stored also in the auxiliary oil storage 71 in the input gear cover 70.

Further, during transmission of the gear transmission mechanism G, especially, during the forward rotation of the motor M (when an vehicle starts to move forward), the input gear Gi, the counter gear Gc, the counter pinion Gcp, and the final driven gear Gf rotate in a direction, for example, indicated by the hollow arrows in FIGS. 2 and 4. In accordance with this rotation, the oil inside the oil storage 15 is scooped up by the final driven gear Gf that is located in the lowest position and that has the largest diameter, and then scatters to various parts inside the transmission mechanism chamber 10.

The transmission case Ct in the embodiment includes the first oil capturing part H1 capable of capturing the oil scattered from the input gear Gi rotating at high speeds. As is obvious also from FIG. 4, the oil inlet port H1i of the first oil capturing part H1 is located on the front side in the forward rotation direction of the input gear Gi on the common tangent line of the pitch circles of the input gear Gi and the counter gear Gc. This enables the first oil capturing part H1, during rotation of the input gear Gi at high speeds, to efficiently capture the oil that is scattering upward from the input gear Gi after the input gear Gi and the counter gear Gc mesh with each other, and to supply the captured oil to various lubrication target parts located inside the unit case C.

That is, the portion of the oil captured by the first oil capturing part H1 is supplied to the first motor bearing Bm1 on the left side (that is, closer to the transmission device T), through the first oil supply passage 17 penetrating through the partition wall 12s on a right side of the first oil capturing part H1. A portion of the other oil, that is, the oil other than one captured by the first oil capturing part H1, is supplied to the second differential bearing Bf2 on the right side or to a surrounding area of the second drive shaft 52 through the slit-hole-like third oil supply passage 85 provided on the case body 81 of the intermediate case 80. Furthermore, the remaining oil of the above-described other oil (that is, the oil passing just around the inlets of the first and third oil supply passages 17, 85) enters the through-hole passage 12sh, which is open to the innermost portion of the first oil capturing part H1, and then is supplied to the second motor bearing Bm2 on the right side (that is, far away from the transmission device T) through the second oil supply passage 90.

As described above, the oil captured by the first oil capturing part H1 efficiently lubricates lubrication target parts inside and outside the transmission case Ct, that is, each of the above-described bearings Bm1, Bm2, Bf2, and others.

Moreover, the transmission case Ct in the embodiment includes the input gear cover 70 that covers the input gear Gi and that is capable of storing the oil in the lower portion of the inner space, and the first oil capturing part H1 is arranged inside the input gear cover 70. Accordingly, inside the input gear cover 70 including, at its inner bottom, the auxiliary oil storage 71 for the input gear, it is possible to sufficiently scatter the oil from the input gear Gi with a centrifugal force, and efficiently capture the scattered oil by the first oil capturing part H1 facing the oil inlet port H1i inside the input gear cover 70, thus further effectively lubricating the above-described lubrication target parts.

The second differential bearing Bf2 on the right side, in the embodiment, is attached to the intermediate case 80 coupled to the partition wall 12s of the transmission case Ct, and the partition wall 12s defines the first oil capturing part H1 together with the intermediate case 80. That is, since the intermediate case 80, which is a portion of the forming wall of the first oil capturing part H1, is used also as a support member for the second differential bearing Bf2, a device structure is simplified correspondingly, and thus, cost reduction is achieved.

Moreover, since the intermediate case 80 includes the through-hole, that is, the slit-like third oil supply passage 85, guiding the portion of the oil captured by the first oil capturing part H1 to the second differential bearing Bf2, the oil captured by the first oil capturing part H1 can be effectively used to lubricate the second differential bearing Bf2 and the like as well. Since it is possible to form an oil introduction passage from the first oil capturing part H1 to the second differential bearing Bf2 just by making the through-hole-like third oil supply passage 85 in the intermediate case 80, the oil passage structure is simplified.

In the power unit PU in the embodiment, the unit case C includes, on the front side in the forward rotation direction of the counter gear Gc relative to the first oil capturing part H1, and the second oil capturing part H2 capable of capturing the oil scattered from the counter gear Gc. The second oil capturing part H2 communicates with the second oil supply passage 90 in the second case half body 12.

Accordingly, it is possible to efficiently capture not only the oil scattered from the input gear Gi, but also the oil scattered radially outward from the counter gear Gc with the centrifugal force, using the second oil capturing part H2, and then to combine the captured oils with the oil in the second oil supply passage 90 from the first oil capturing part H1 toward the second motor bearing Bm2. Accordingly, it is possible to more efficiently lubricate the second motor bearing Bm2 located farther than the transmission device T by utilizing not only the first oil capturing part H1, but also the second oil capturing part H2.

In this case, if an orientation of a helical shape of the helical teeth of the counter gear Gc is set such that the oil scatters while being biased to the axially right side relative to the gear teeth, especially, during the forward rotation of the motor M, it is possible to more efficiently capture the scattered oil from the counter gear Gc by the second oil capturing part H2 located axially rightward on a front upper outer circumference of the counter gear Gc.

In the embodiment, the final driven gear Gf as the large diameter gear meshes with the counter pinion Gcp in a specific semi-circumferential area (a semi-circumferential area rearward from the rotational axis Xi in FIG. 2) where the tooth surface moves from the lower end of the final driven gear Gf toward its upper end in accordance with forward rotation of the final driven gear Gf. Each of the counter pinion Gcp and the final driven gear Gf, which is a helical gear, is arranged such that the oil on the tooth surface from the mutual meshing portion 40 is pushed to an axially left side of the counter pinion Gcp (that is, in the direction indicated by the dotted arrow in FIG. 1) during the forward rotation of the final driven gear Gf. Moreover, as is obvious from FIG. 1, the first counter bearing Bc1 comprises a shielded bearing as a fluid restriction wall that restricts the oil from flowing to the left side opposite to the oil pushed from the meshing portion 40 to the axially left side. The first counter bearing Bc1 is arranged adjacent to the axially left tooth end of the counter pinion Gcp and is shaped such that the tooth tip portions of the end faces can be covered.

Accordingly, the oil pushed from the meshing portion 40 of the final driven gear Gf and the counter pinion Gcp to the axially left side of the counter pinion Gcp during the forward rotation of the final driven gear Gf is restricted from flowing toward the axially left side by the first counter bearing Bc1 (shielded bearing as the fluid restriction wall) opposing the pushed oil. This allows the oil accumulating in a location just before the bearing Bc1 to more easily flow to a tooth portion of the final driven gear Gf. This makes it possible to carry this oil more easily and scoop up the oil by the final driven gear Gf, thus effectively increasing the oil amount at which the gear Gf is scooped to its gear top portion. As a result, although such a layout allows the final driven gear Gf to mesh with the counter pinion Gcp while the oil being scooped up, it becomes possible to sufficiently supply the oil to the top portion of the final driven gear Gf.

As is obvious from FIG. 1, especially, the axially width of the counter pinion Gcp in the embodiment is set such that the tooth portion of the pinion Gcp extends to the axially left side relative to the above-described meshing portion 40. Accordingly, when the oil pushed to the axially left side from the above-described meshing portion 40 accumulates in a near side of the first counter bearing Bc1 serving as the fluid restriction wall (especially, on the tooth surface extending to the axially left side relative to the meshing portion 40 of the counter pinion Gcp), it is possible to scatter a portion of the accumulated oil radially outward from the counter pinion Gcp with the centrifugal force to supply the oil to the surrounding lubrication target parts.

In this case, since the side wall 11s of the first case half body 11 (especially, bowl-shaped portion surrounding a the differential case Dc) includes, on its inner circumference, a plurality of oil guiding ribs (not shown) in a protruding manner, the oil that scatters from the counter pinion Gcp and that is adhered to an inner surface of the side wall 11s can be also efficiently guided and supplied oil to the first differential bearing Bf1 on the left side.

In the embodiment, the fluid restriction wall that performs a fluid restriction of the oil pushed to the axially left side from the above-described meshing portion 40 to accumulate in the near side is formed of the first counter bearing Bc1, which is the shielded bearing that supports the counter pinion Gcp on the transmission case Ct. Accordingly, the shielded bearing with an oil seal function that has been commonly used is utilized, thus making it possible to easily structure the above-described fluid restriction wall at low cost.

As the above-described fluid restriction wall, other than the present embodiment in which the shielded bearing (first counter bearing Bc1) also works as the fluid restriction wall, a variety of variations are applicable. For example, a modified example is also possible in which a flat washer is held between the tooth portion of the counter pinion Gcp and the first counter bearing Bc1 that is not a shielded bearing, and this flat washer is utilized as the fluid restriction wall. Alternatively, another modified example is also possible in which an annular-flange-like protruding wall formed integrally to an outer peripheral portion of the counter shaft 14 and interposed between the tooth portion of the counter pinion Gcp and the first counter bearing Bc1 that is not a shielded bearing can be used as the fluid restriction wall.

Alternatively, a further modified example is also possible in which a radially flat bearing (for example, a needle bearing) is used as the first counter bearing Bc1, this radially flat bearing is located in a fitting portion between the counter shaft 14 and the side wall 11s of the first case half body 11. In this modified example, the side wall 11s has its inner wall that is closer or adjacent to a left end face of the tooth portion of the counter pinion Gcp, and the inner wall of the side wall 11s can be utilized as the fluid restriction wall.

As is obvious from FIG. 1, the differential case Dc of the differential device D in the embodiment includes the window portion Dch that is arranged in a position offset to the axially left side relative to the final driven gear Gf and that allows communication with the inside and the outside of the differential case Dc. Accordingly, when the above-described oil pushed to the axially left side on the tooth surface of the counter pinion Gcp during the forward rotation of the final driven gear Gf is scattered with the centrifugal force, the oil is easily introduced into the window portions Dch. Accordingly, since the oil scattered from the counter pinion Gcp is efficiently supplied to the differential gear mechanism Dg inside the differential case Dc through the window portions Dch, a lubricating effect on the differential gear mechanism Dg can be also increased.

The unit case C in the embodiment, especially, the second case half body 12 includes the partition wall 12s, of which the left face 12si faces the transmission mechanism chamber 10 and the right face 12so faces the motor space 20. The left face 12si of the partition wall 12s and the intermediate case 80 serving as a lid that is coupled to the left face 12si define the breather chamber 60. The inlet 60i of the breather chamber 60 is open to the right face 12so of the partition wall 12s and is communicable with the motor space 20.

Accordingly, since the inlet 60i of the breather chamber 60 has a communicating configuration that is not open directly to the transmission mechanism chamber 10 and that communicates with the transmission mechanism chamber 10 through the motor space 20, the oil scattered from each gear of the gear transmission mechanism G inside the transmission case Ct can be effectively inhibited from entering the breather chamber 60. This can reduce a risk of splashing the oil from the breather chamber 60. Moreover, since the breather chamber 60 is defined by the left face 12si of the partition wall 12s of the transmission case Ct and the intermediate case 80 serving as the lid coupled thereto, it is also possible to easily obtain a hollow structure of the breather chamber 60 separated from the transmission mechanism chamber 10 without complicating the structure of the partition wall 12s of the transmission case Ct and its molding process, thus achieving cost reduction accordingly.

Although the embodiment of the present invention has been described hereinabove, the present invention is not limited to the embodiment, and various design modifications may be made thereto without departing from the gist of the present invention.

For example, in the above-described embodiment, the gear transmission mechanism G of the transmission device T includes a so-called two-axis gear transmission mechanism, in which the input gear Gi and the final driven gear Gf (and thus, the drive shafts 51, 52) rotating about the axis different from the axis Xc of the counter gear Ge are arranged on a coaxial line thereof. However, in the present invention, a so-called three-axis gear transmission mechanism may be employed in which the input gear Gi, the counter gear Gc, and the final driven gear Gf (and thus, the drive shafts 51, 52) rotate about different three axes.

In the above-described embodiment, the transmission device T comprises the differential device D in addition to the reduction device R, in which an outputter of the reduction device R, that is, a rotational torque of the final driven gear Gf is distributed to the pair of the drive shafts 51, 52 (and thus, left and right drive wheels) via the differential device D. However, in the present invention, the differential device D may be omitted, and the final driven gear Gf may be interlocked with and coupled to a single drive shaft via an interlocking mechanism without a differential function. In this case, the drive shaft can rotate to drive a single drive wheel (for example, a rear wheel of a motorcycle).

In the above-described embodiment, the power unit PU is used in a power unit for an automobile. However, the power unit of the present invention may be applicable to a power unit in various machine devices other than automobiles.

In the above-described embodiment, during the forward rotation of the final driven gear Gf, the counter pinion Gcp and the final driven gear Gf in which the orientation of helix shapes of the helical teeth of both gears Gcp, Gf (in other words, helix angles) are set such that the oil on the tooth surface is pushed from the meshing portion 40 to the axially left side of the counter pinion Gcp in accordance with the mutual mesh between the counter pinion Gcp and the final driven gear Gf. However, in the present invention, the orientation of the helix shapes of the helical teeth of both gears Gcp, Gf may be set to an orientation opposite to that in the embodiment. In this case, since the oil on the tooth surface is pushed from the meshing portion 40 to the axially right side of the counter pinion Gcp in accordance with the mutual mesh between the counter pinion Gcp and the final driven gear Gf in the above-described forward rotation, the fluid restriction wall adjacent to the tooth end face on the axially right side of the counter pinion Gcp is annularly provided on an outer circumference of the counter shaft 14 in a protruding manner, and the axially width of the counter pinion Gcp is set such that the tooth portion of the counter pinion Gcp extends from the above-described meshing portion 40 to the axially right side. In this setting, an extending portion of the tooth portion of the counter pinion Gcp is located in a position axially coincident with or close to the second differential bearing Bf2, so that it is also possible to increase an oil supply amount to the second differential bearing Bf2 as the oil that is pushed by the extending portion of the tooth portion and that accumulates in the near side of the fluid restriction wall is scattered with the centrifugal force.

In the above-described embodiment, the intermediate case 80 also works as means for forming the breather chamber 60 together with the partition wall 12s, means for forming the input gear cover 70, and means for supporting the second differential bearing Bf2. However, the intermediate case 80 may also work as any two of these means, or may be exclusively used as any one of these means.

In the above-described embodiment, each gears Gi, Gc, Gcp, Gf of the gear transmission mechanism G of the transmission device T is formed of a helical gear. However, of these gears Gi, Gc, Gcp, Gf, at least one gear pair (for example, a gear pair of the input gear Gi and the counter gear Gc, or a gear pair of the final driven gear Gf and the counter pinion Gcp) that mesh with each other may each be formed of a spur gear.

The invention claimed is:

1. A breather structure in a power unit, the power unit comprising:
   a motor; and
   a transmission device that is configured to receive an output of the motor, the transmission device including:
     a gear transmission mechanism capable of transmitting the output of the motor to a drive shaft; and
     a transmission case including therein a transmission mechanism chamber housing the gear transmission mechanism, the transmission case and a motor case for the motor forming a unit case of the power unit,
   wherein the unit case includes:
     an oil supply passage configured to supply at least one bearing of a motor output shaft with a portion of an oil lubricating the gear transmission mechanism;
     an oil return passage configured to return an oil from a motor space inside the motor case to the transmission mechanism chamber; and
     a partition wall having one side face facing the transmission mechanism chamber and an other side face facing the motor space,
   wherein the one side face of the partition wall and a lid coupled to the one side face define a breather chamber that is shielded from the transmission mechanism chamber and that is open to an atmospheric air, and
   wherein the breather chamber includes an inlet that is open to the other side face of the partition wall and that communicates with the motor space.

2. The breather structure in a power unit according to claim 1,
   wherein the gear transmission mechanism includes, on an output side of a gear transmission path thereof, a final driven gear configured to transmit a rotational driving force to the drive shaft, and
   wherein at least a portion of the breather chamber overlaps with the final driven gear as viewed from an axial direction of the final driven gear.

3. The breather structure in a power unit according to claim 1,
   wherein the gear transmission mechanism includes a counter gear on a gear transmission path, and
   wherein at least a portion of the breather chamber overlaps with the counter gear as viewed radially outward from a rotational axis of the counter gear.

4. The breather structure in a power unit according to claim 1,
   wherein the other side face of the partition wall is provided with a protruding wall protruding toward the motor space and surrounding the inlet of the breather chamber.

5. The breather structure in a power unit according to claim 1,
   wherein the inlet of the breather chamber faces a stator fixed inside of the motor case.

\* \* \* \* \*